(12) United States Patent
Kurd

(10) Patent No.: US 7,840,628 B2
(45) Date of Patent: Nov. 23, 2010

(54) COMBINING CIRCUITRY

(75) Inventor: Tariq Kurd, Bristol (GB)

(73) Assignee: STMicroelectronics (Research & Development) Limited, Buckinghamshire (GB)

( * ) Notice: Subject to any disclaimer, the term of this patent is extended or adjusted under 35 U.S.C. 154(b) by 1262 days.

(21) Appl. No.: 11/400,041

(22) Filed: Apr. 7, 2006

(65) Prior Publication Data
US 2006/0277242 A1 Dec. 7, 2006

(30) Foreign Application Priority Data
Apr. 7, 2005 (EP) .................................. 05252193

(51) Int. Cl.
*G06F 7/52* (2006.01)
(52) U.S. Cl. ..................................................... 708/625
(58) Field of Classification Search .................. 708/625
See application file for complete search history.

(56) References Cited
U.S. PATENT DOCUMENTS
5,253,195 A 10/1993 Broker et al.

6,286,024 B1 * 9/2001 Yano et al. ................... 708/625
6,598,064 B1 7/2003 Green

OTHER PUBLICATIONS

Taylor, G. et al.: "A 100 MHz Floating Point/Integer Processor", Proceedings of the Custom Integrated Circuits Conference, Boston, May 13-16, 1990, New York, IEEE, US, vol. Conf.. 12, May 13, 1990, pp. 2451-2454, XP000167744.

* cited by examiner

*Primary Examiner*—Tan V Mai

(57) ABSTRACT

A combining circuit and method combines a plurality of terms in a multiplier circuit. The combining circuit includes a first circuit, arranged to receive a first set of the plurality of terms and to combine the first set of terms to produce a first combined term set. The combining circuit also includes a second circuit, arranged to receive a second set of the plurality of terms and to combine the second set of terms to produce a second combined term set. The combining circuit further includes a third circuit, arranged to receive the first and second combined term sets and to combine the first and second combined term sets to produce a third combined term set. The combining circuit outputs the first combined term set as a first combination result and the third combined term set as a second combination result.

20 Claims, 3 Drawing Sheets

Floating point multiplication
PRIOR ART

COMBINING CIRCUITRY

FIELD OF THE INVENTION

The present invention relates to combining circuitry. The present invention relates particularly to combining circuitry for combining a plurality of terms in a multiplier circuit.

BACKGROUND OF THE INVENTION

Binary floating point numbers such as those defined in the Institute of Electrical and Electronic Engineers (IEEE) standard 754 are capable of representing floating point numbers which can be operated on quickly and simply within a binary computer. A generalised example of an IEEE 754 standard floating point number is $+(X.Y)*(2^n)$. The floating point number has three basic components, the sign, the exponent, and the mantissa.

In the generalised form shown above the '+' part is represented by the sign component, the 'X.Y' part by the mantissa, and the '$2^n$' component by the exponent.

The mantissa is composed of the fraction, representing the 'Y' part, and an implicit leading digit representing the 'X' part. The implicit leading digit is a '1' when the floating point is a normalised number, and a '0' when the floating point is a denormalised number. A number is normalised when the exponent part of the number is greater than its smallest number.

The exponent is required to represent both positive and negative numbers. In order to do this a bias value is added to the actual exponent value in order to get the stored exponent. Furthermore the exponent values of −127 (all 0's) and +128 (all 1's) are reserved for special numbers.

As is known in the art a single precision or 32 bit floating point number according to the IEEE standard has 1 bit allocated for the sign part, 8 bits allocated to the exponent, and 23 bits allocated to the fraction. However double precision or 64 bit floating point numbers are similarly known, whereby 1 bit is allocated to the sign part, 11 bits allocated to the exponent, and 52 bits allocated to the fraction.

Therefore the smallest normalised number for a single precision number is $2^{-126}$ and for a double precision number is $2^{-1022}$.

Floating point multiplication circuitry is also known in the art. FIG. 1 shows a schematic view of a known single precision floating point multiplier circuit 1 capable of multiplying floating point numbers FA and FB. The numbers FA and FB are also known as operands. FIG. 1 shows that in order to carry out a floating point multiplication the multiplier circuitry 1 is divided into five circuit elements, explained below.

A comparator 2 compares sign bits S_FA, S_FB to determine if the output value is a positive or negative number. This is carried out in FIG. 1 by the XNOR gate.

An integer multiplier 3 multiplies the operand mantissas M_FA and M_FB to produce a mantissa product M_FC.

An adder stage 5, 7 adds the operand exponents E_FA and E_FB, with an additional offsetting to compensate for the original offset of E_FA and E_FB, to produce an exponent sum E_FC.

A post multiplication normaliser 9 normalises the mantissa product to bring the mantissa back into the form 1.Y, i.e. with an implicit leading value of 1. The normalisation may require the exponent sum E_FC to be modified.

Finally a rounding circuit 11 rounds the normalised mantissa product, to reduce the number of bits used to represent the number and therefore enable the product to be represented by the same number format as the operands.

In a typical digital signal processing circuit or general purpose processor it is typical to save space by using the same integer multiplier for the multiplication of operand floating point mantissas and for standard integer multiplication. For example multiplication using a 32 bit or single precision floating point number would typically use the same multiplier block as a double or 32 bit integer multiplication.

A typical integer multiplier comprises an operand encoder, a partial product generator, a product term compressor or combiner, and a final term addition stage. The operand encoder encodes the first operand and reduces the number of terms representing the operand. The partial product generator multiplies the second operand by each of the encoded terms to produce partial product terms. The product term compressor adds together (or as otherwise known compresses) the many partial products to form a pair of terms. Finally the addition stage adds the pair of terms together to form the final value.

The product term compressor is carried out by a series of compression stages, each of which comprise compression circuit cells. Examples of compression circuit cells are half-adders, full-adders and 4:2 compressors, which receive a number of inputs and output a sum with fewer outputs.

Compression stages have been typically designed to optimise the reduction of all of the possible partial products terms generated by the full width of the operand to form two terms within the smallest number of consecutive stages.

As the speed of the processing is fixed by the number of compression stages a floating point mantissa multiplication takes the same amount of time as an integer calculation. This results in a floating point multiplication taking a much greater amount of time to complete than a integer multiplication due to the additional processes required to produce a complete result such as those described above.

SUMMARY OF THE INVENTION

To address the above-discussed deficiencies of the prior art, it is therefore an aim of the embodiments of the present invention to address or partially mitigate the problem discussed previously of speeding up the floating multiplication with respect to unsigned or signed integer multiplication.

According to one aspect of the invention there is provided combining circuitry for combining a plurality of terms in a multiplier circuit; said circuitry comprising: a first circuit arranged to receive a first set of the plurality of terms, and to combine the first set of terms to produce a first combined term set; a second circuit arranged to receive a second set of the plurality of terms, and to combine the second set of terms and produce a second combined term set; and a third circuit arranged to receive the first and second combined term sets; the third circuit further arranged to combine the first and second combined term sets to produce a third combined term set; wherein the first combined term set is output as a first combination result and the third combined term set is output as a second combination result.

The separation of the first combination result and the second combination result allows embodiments of the present invention to produce a result generated by combining a subset of the plurality of terms quicker than combining the full set of the plurality of terms.

The plurality of terms may comprise a plurality of partial product terms and a carry in term, and the first set of terms may comprise a first set of the plurality of partial product terms and the carry in term.

The inputting of the carry term with a first set of the plurality of partial terms ensures the carry in term is handled as part of the first combination result as well as the second combination result.

The second set of terms may comprise the remainder of the plurality of product terms.

The remainder of the plurality of product terms being the second set of terms enables the second combination result to be dependent on all of the partial product terms and the carry in term.

A multiplier for multiplying two operands may comprise combining circuitry as described above and an adder wherein the adder may be arranged to receive and may add the first combination result to produce a first multiplication result, and may furthermore be arranged to receive and add the second combination result to produce a second multiplication result.

The multiplier therefore uses the combining circuitry to produce a first multiplication result using the first combination result and a second multiplication result using the second combination result allowing different results to be created dependent on whether a subset of the products are used or not.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "apparatus" and "controller" may be used interchangeably and mean any device, system or part thereof that controls at least one operation, such a device may be implemented in hardware, firmware or software, or some combination of at least two of the same. It should be noted that the functionality associated with any particular apparatus or controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF DRAWINGS

For a better understanding of the present invention and to show how the same may be carried into effect, reference will now be made by way of example only to the accompanying drawings in which like reference numerals represent like parts, and in which.

DETAILED DESCRIPTION OF THE INVENTION

Figure 1:
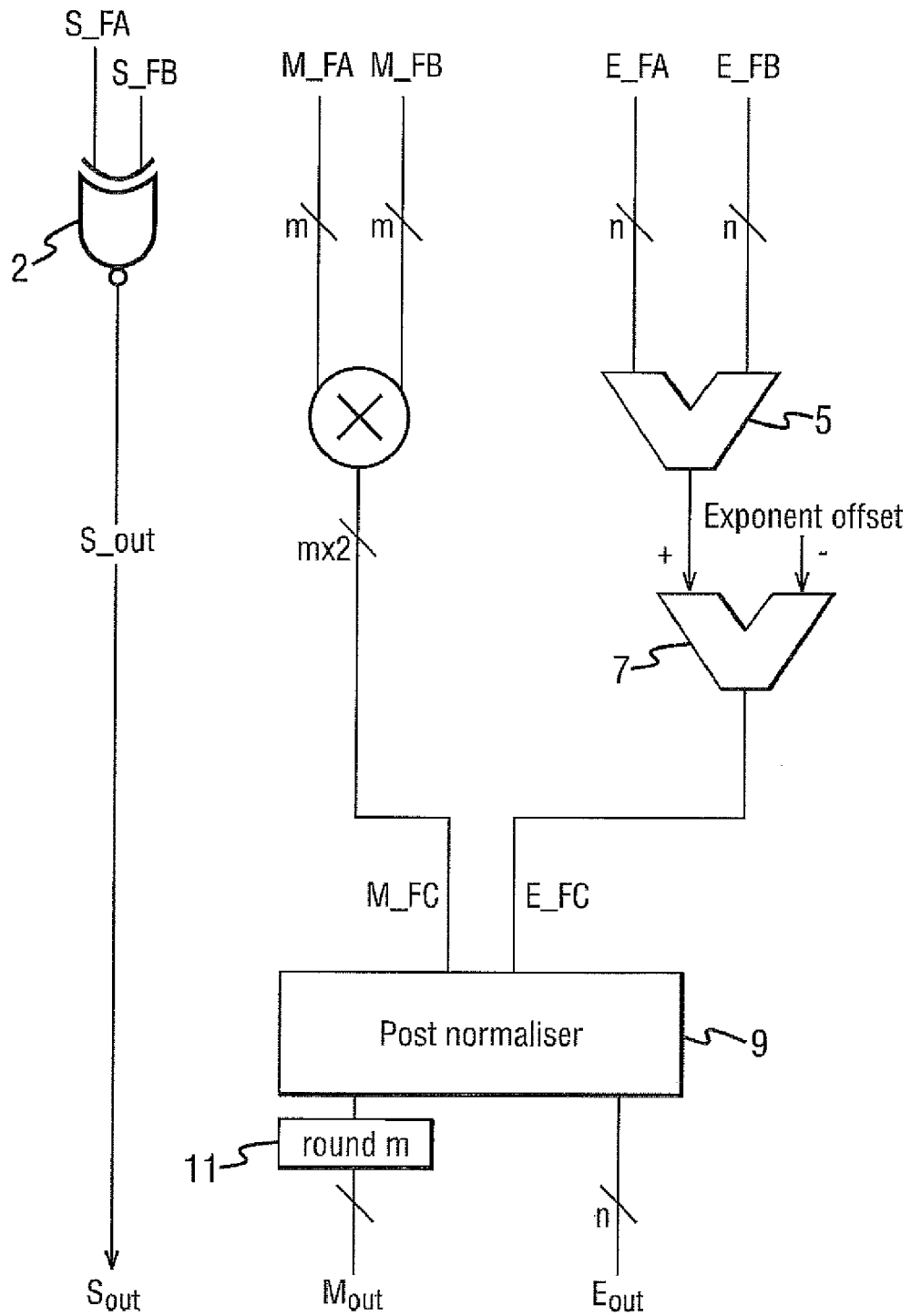
FIG. 1 shows a schematic view of a floating point multiplier as known in the art.
Figure 2:
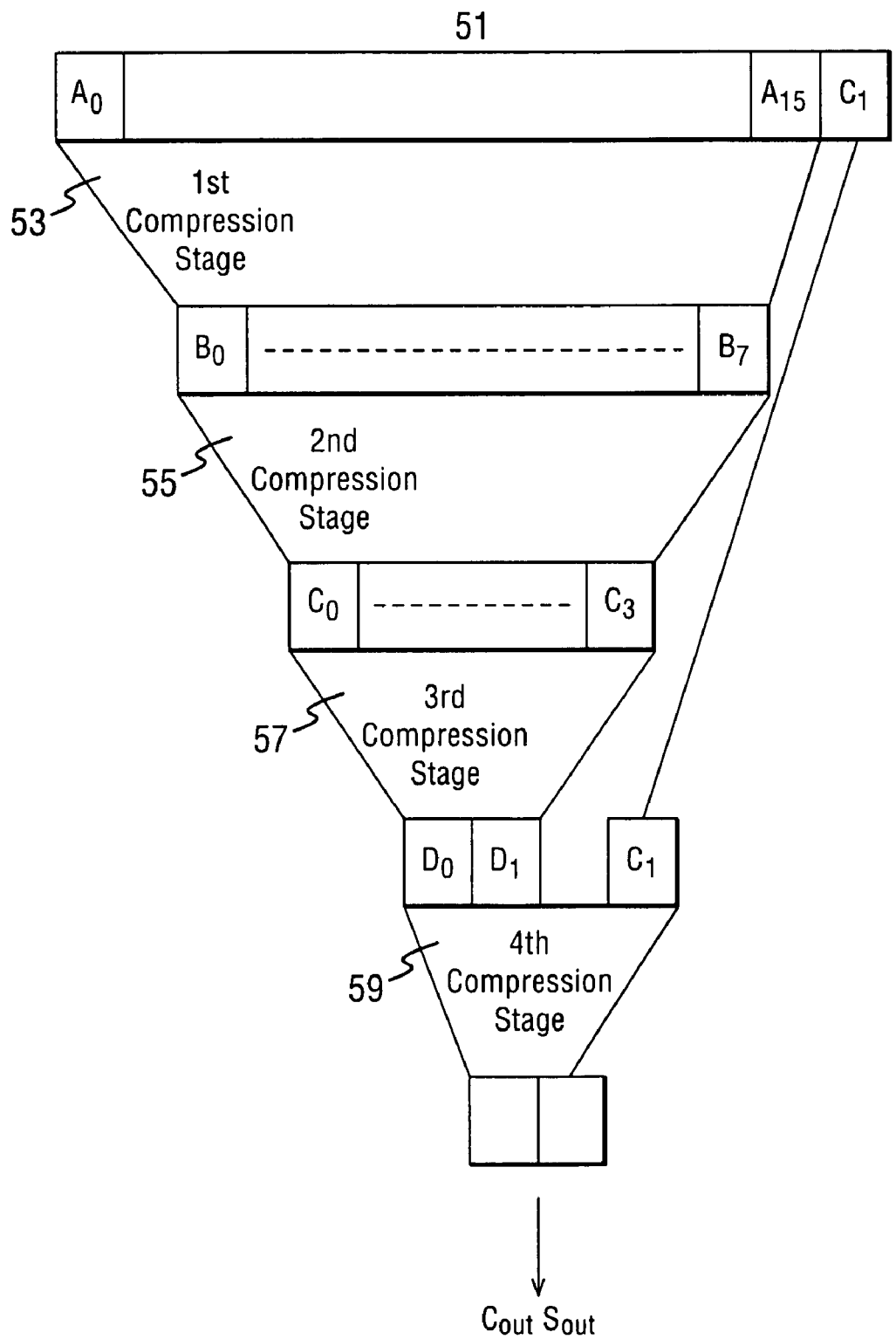
FIG. 2 shows a schematic view of a single structure compression circuit.
Figure 3:
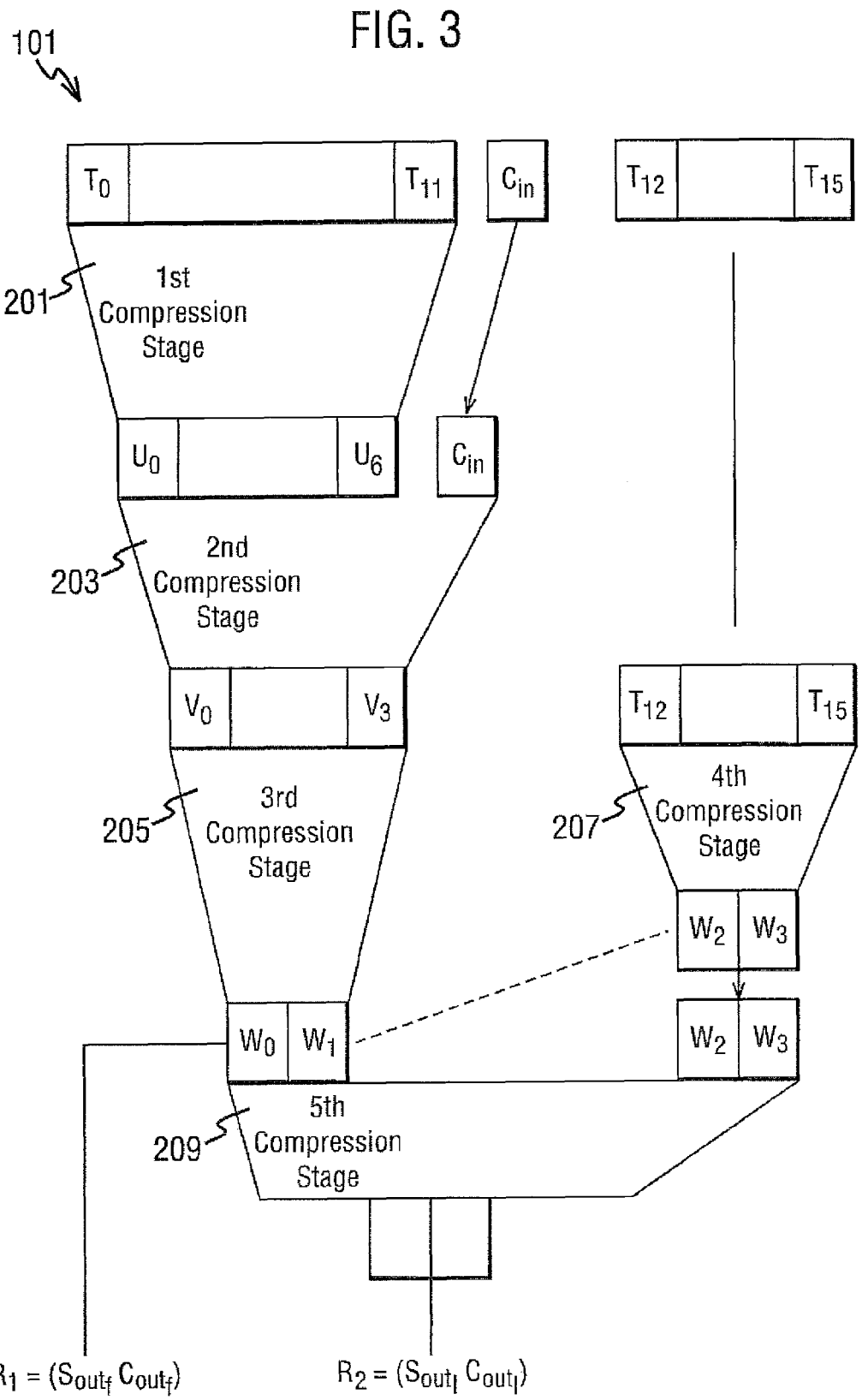
FIG. 3 shows a schematic view of a compression circuit embodying the present invention.

FIGS. 2 through 3, discussed below, and the various embodiments used to describe the principles of the present invention in this patent document are by way of illustration only and should not be construed in any to limit the scope of the invention. Those skilled in the art will understand that the principles of the present invention may be implemented in any suitably arranged multiplier circuit.

For the following examples a multiplier block for 32 bit operands is described. As would be understood by the person skilled in the art, these techniques are not limited only to the examples described below but are equally applicable to multiplier blocks capable of performing operations on operands greater than 32 bits.

The encoding, partial product generation, and addition stages of 32 bit integer multiplication blocks are not described in further detail. However for the examples described with reference to FIG. 2 and the embodiment of FIG. 3 the encoding stage is assumed to implement a booth coding algorithm which when input to the second stage produces 16 partial products. There are therefore 16 partial product terms to be compressed. Furthermore a carry term as known in the art is also introduced.

With reference to FIG. 2 an existing single structure compression circuit 51 for a 32 bit multiplier block is shown. The compression circuit 51 comprises a first compression stage 53, a second compression stage 55, a third compression stage 57, and a fourth compression stage 59.

The compression circuit receives the sixteen partial product terms $A_0, \ldots, A_{15}$ and a carry term $C_I$.

The first compression stage receives the sixteen partial product terms $A_0, \ldots, A_{15}$ and compresses these sixteen terms into eight terms.

The principle of these compression stages, which can also be called adding stages, is generally known in the art. The compression stages comprise compression cells (not shown) such as half adders, full-adders (3:2 compressor cells) and 4:2 compressor cells. In the type of compression stage described with respect to the example of FIG. 2 and the embodiment as shown in FIG. 3 these compression cells receive a number of input bits each of which has the same binary weight, for example the binary weight of $2^n$. This type of grouping the input bits by their weighting produces a structure known in the art as a Wallace tree.

The compression cells add together these inputs to produce at least one sum bit of the same weight as the inputs, $2^n$, and at least one carry bit with a bit weighting one greater than the sum bit, $2^{n+1}$. The total number of these output bits however is less than the number of input bits. For example the full adder takes three input bits (2 input bits and a carry input bit) and generates one sum bit and one carry bit. A 4:2 compressor receives 5 input bits (4 input bits and a carry input bit) and outputs one sum bit, and two carry bits.

The compression cells are arranged so that both the sum and the carry outputs are passed to the next compression stage. As the terms are grouped in terms of their weighting, the sum bit outputs passed to the next compression stage are input to the compression cells of the next compression stage along with the carry bit outputs from the lower weighting. The carry bit outputs are passed to the next compression stage and input to the compression cells along with the output of the sum bit outputs from the higher weighting bits. In the following examples it is assumed that the bits for the terms have been grouped into each weighting prior to inputting to the next compression stage—in other words the process of passing carry outs and receiving carry outs has been accomplished.

In the following examples it has been assumed that as the number of carry outs between each stage is equal to the number of carry ins for many of the grouping or weighting of the bits then the number of bits input to the next stage for each grouping or weighting of bits is equal to the number of bits output from the last stage for each grouping or weighting of bits.

Although this assumption is not true for grouping or weightings at the extremities, very high or very low weightings, which may not have as many initial partial product terms or do not receive any carry in bits from previous stages it would be understood by the skilled person that the circuitry described below would still function for these weightings and would still produce the required two values at the same time as the other weightings. In these cases some of the inputs to the compression cells may be fixed to zero to prevent any errors occurring.

Thus the first compression stage 53 of the circuit of FIG. 2 has to handle at least 16 input bits. One prior art arrangement for each grouping or weighting of bits uses four 4:2 compressor cells (not shown) to carry out the compression.

The second compression stage 55 receives eight terms $B_0, \ldots, B_7$ output from the first compression stage 53 and compresses these eight terms into four terms. Each grouping or weighting of bits uses two 4:2 compressor cells (not shown) to carry out this stage of the compression.

The third compression stage 57 receives four terms $C_0, \ldots, C_3$ output from the second compression stage 55 and compresses these four terms into two terms. Each grouping or weighting of bits uses a single 4:2 compressor cell (not shown) to carry out this stage of the compression.

The fourth compression stage 59 receives the two terms $D_0, D_1$ output from the third compression stage 57 and receives the additional carry in input bit $C_I$. The fourth compression stage outputs two terms $C_{out}, S_{out}$. These pair of output terms form the input for the final addition stage (not shown). Each grouping or weighting of bits uses a single 3:2 compressor cell (not shown).

As FIG. 2 shows, the reduction of 17 terms to 2 terms using conventional compressor cells requiring the compression circuit to pass through 4 stages of compression.

FIG. 3 shows schematically an embodiment of an improved compression circuit 101 with resultant advantages for floating point multiplication. The embodiment of FIG. 3 also describes a compressor circuit for a 32 bit integer multiplication block.

The improved compression circuit 101 comprises a first compression stage 201, a second compression stage 203, a third compression stage 205, a fourth compression stage 207, and a fifth compression stage 209.

The first compression stage 201 receives only the first eleven of the sixteen partial product terms $T_0, \ldots, T_{12}$ and the Carry term $C_I$, and compresses these thirteen teens into seven terms. Each grouping or weighting of bits uses three 4:2 compressor cells (not shown) to carry out the compression.

The second compression stage 203 receives the seven terms $U_0, \ldots, U_6$ output from the first compression stage 201 and compresses these seven terms into four terms. Each grouping or weighting of bits uses one 4:2 compressor cell and a 3:2 compressor cell (not shown) to carry out this stage of the compression.

The third compression stage 205 receives four terms $V_0, \ldots, V_3$ output from the second compression stage 203 and compresses these four terms into two terms $W_0, W_1$. Each grouping or weighting of bits uses a single 4:2 compressor cell (not shown) to carry out this stage of the compression.

The two output terms $W_0, W_1$ from the third compression stage 205 are connected to the final addition stage of the integer multiplier as a first pair of product terms $(S_{outF}, C_{outF})$ which are added together to generate a first multiplication result $R_1$ (the final addition stage is not shown in FIG. 3).

The fourth compression stage 207 receives the last four partial product terms $T_{12}, \ldots, T_{15}$ and compresses these four terms into two terms. Each grouping or weighting of bits uses a single 4:2 compressor cell (not shown) to carry out this stage of the compression.

The fifth compression stage 209 receives the two terms $W_0, W_1$ output from the third compression stage 205 and the two terms $W_2, W_3$ from the fourth compression stage 207 and compresses these four terms into two terms. Each grouping or weighting of bits uses a single 4:2 compressor cell (not shown) to carry out this stage of compression.

These two output terms $S_{outI}, C_{outI}$ are also connected to the final addition stage of the integer multiplier to generate a second multiplication result.

The advantage of the structure of the improved compressor circuit 101 can be shown when comparing how the improved compressor circuit performs compression calculation for both a integer and floating point multiplication.

When the improved compressor is used within a multiplier block to calculate a full integer multiplication two 32 bit operands are used. With booth encoding this generates 16 compression terms and an additional carry term. The improved compression circuit compresses these seventeen terms down to two terms $S_{outI}, C_{outI}$ in four stages from the output of the fifth compression stage, with most of the terms passing through the first, second, third and fifth stage and four terms passing through the fourth and fifth stages only.

As the terms $T_{12}, \ldots, T_{15}$ are not required until after the second compression stage 203 has carried out its compression the timing constraints imposed on encoding and generating stages to generate all 16 terms is less strict than is required for any encoding and generating circuitry in multiplier circuitry using the existing compression circuitry. Therefore embodiments of the present invention used in multiplier circuitry allow the development of differing speed circuitry for the first twelve terms and the final four terms allowing the circuit designer to either optimise speed of performance or power consumption.

In a 32 bit floating point multiplication, although the complete operand is 32 bits wide, the mantissa is only 24 bits wide. Thus for floating point multiplication there are only a maximum of 13 terms to compress—12 partial product terms and the additional carry term.

In the improved compression circuit 101 only three stages are required to reduce the 13 terms to form the 2 terms $S_{outf}, C_{outf}$. The 12 partial product terms pass through the first stage, are joined by the carry term in the second stage and finally pass through the third stage. The speed of producing a floating point mantissa multiplication is one compression stage faster in the improved compression circuit than the full integer multiplication speed.

Although the embodiment has been described with relation to a single precision/32 bit operand multiplication it would be apparent to the person skilled in the art that an equivalent speed increase would be possible in a double precision/64 bit operand multiplier. such a device has to handle a 64 bit operand multiplier generating 32 partial product and 1 carry term and the 53×53 bit floating point mantissa product with 26 terms and 1 carry term.

A further embodiment of the present invention (not shown) has first to fourth compression stages, a fifth and sixth compression stage, a and a seventh compression stage.

The first compression stage receives 26 partial product terms and outputs 13 terms. The second compression stage receives the 13 terms output from the first stage and the carry in term and outputs 8 terms. The third compression stage receives the 8 terms output from the second stage and produces 4 terms. The fourth compression stage receives the four terms from the third stage and outputs a pair of terms. This pair of terms are output to the addition circuitry to produce the result for the floating point mantissa multiplication.

The remaining six partial product terms are input to a fifth compression stage. The fifth stage outputs are connected to the inputs of the sixth compression stage to produce at the outputs of the sixth stage a further pair of terms.

The seventh compression stage receives the pair of outputs from the fourth compression stage and the pair of outputs from the sixth compression stage to produce a pair of terms out of the full 33 terms. The pair of terms from the seventh compression stage is output to the addition circuitry to produce the result for the full width integer multiplication.

Thus in order to generate the pair of terms for the 53×53 bit floating point calculation the partial product and carry-in terms have to pass through four stages of compression (stages 1 to 4). To generate the full 64×64 bit calculation the partial product terms pass through five stages of compression (the first 26 partial products and carry in term passing through stages 1 to 4 and stage 7 and the remaining partial product terms passing through stages 5, 6 and 7).

It would be appreciated by the person skilled in the art that advantages similar to those described with respect to the first embodiment of the invention can be shown by this further embodiment in terms of speed of floating point calculations and circuit composition.

In further embodiments of the present invention arrangements of compression stages to produce faster calculations for operand multiplication having bit widths less than the full width of the multiplication block can be seen to be within the scope of the claimed invention. It is intended that the present invention encompass such changes and modifications as fall within the scope of the appended claims.

What is claimed is:

1. A combining circuit for combining a plurality of partial product terms in a multiplier circuit, the combining circuit comprising:
   a first circuit capable of receiving a first set of the plurality of partial product terms, the first circuit further capable of combining the first set of terms to produce a first combined term set;
   a second circuit capable of receiving a second set of the plurality of partial product terms, the second circuit further capable of combining the second set of terms to produce a second combined term set; and
   a third circuit capable of receiving the first combined term set and the second combined term set, the third circuit further capable of combining the first combined term set and the second combined term set to produce a third combined term set;
   wherein the first combined term set is output as a first combination result and the third combined term set is output as a second combination result.

2. The combining circuit of claim 1, wherein:
   the plurality of partial product terms comprises a carry-in term; and
   the first set of terms comprises a first set of the plurality of partial product terms and the carry-in term.

3. The combining circuit of claim 2, wherein the second set of terms comprises a remainder of the plurality of product terms.

4. The combining circuit of claim 2, wherein:
   the plurality of partial product terms comprises 16 partial product terms; and
   the first set of the plurality of partial product terms comprises 12 partial product terms.

5. The combining circuit of claim 1, wherein the first circuit comprises a plurality of combination stages.

6. The combining circuit of claim 5, wherein the second circuit comprises a plurality of combination stages.

7. The combining circuit of claim 6, wherein the third circuit comprises a single combination stage.

8. The combining circuit of claim 7, wherein each combination stage comprises at least one compression cell.

9. The combining circuit of claim 6, wherein the first circuit comprises more combination stages than the second circuit.

10. The combining circuit of claim 9, wherein the first circuit is arranged to receive the first set of terms before the second circuit receives the second set of terms in order that the first circuit and the second circuit produce the first and second combined term sets at substantially a same time.

11. The combining circuit of claim 1, wherein the first circuit outputs the first combination result before the third circuit outputs the second combination result.

12. A multiplier for multiplying two operands, the multiplier comprising:
   a combining circuit comprising:
      a first circuit capable of receiving a first set of a plurality of partial product terms, the first circuit further capable of combining the first set of terms to produce a first combined term set;
      a second circuit capable of receiving a second set of the plurality of partial product terms, the second circuit further capable of combining the second set of terms to produce a second combined term set; and
      a third circuit capable of receiving the first combined term set and the second combined term set, the third circuit further capable of combining the first combined term set and the second combined term set to produce a third combined term set;
      wherein the first combined term set is output as a first combination result and the third combined term set is output as a second combination result; and
   an adder capable of receiving and adding the first combination result to produce a first multiplication result and to receive and add the second combination result to produce a second multiplication result.

13. The multiplier of claim 12, wherein:
   the two operands are floating point fractions; and
   the first multiplication result is a floating point fraction product.

14. The multiplier of claim 12, wherein:
   the two operands are integer numbers; and
   the second multiplication result is an integer product.

15. The multiplier of claim 12, wherein:
   the plurality of partial product terms comprises a carry-in term;
   the first set of terms comprises a first set of the plurality of partial product terms and the carry-in term; and
   the second set of terms comprises a remainder of the plurality of product terms.

16. The multiplier of claim 12, wherein:
   the first circuit comprises a plurality of combination stages;
   the second circuit comprises a plurality of combination stages; and
   the third circuit comprises a single combination stage.

17. The multiplier of claim 16, wherein:
   the first circuit comprises more combination stages than the second circuit;
   the first circuit is arranged to receive the first set of terms before the second circuit receives the second set of terms in order that the first circuit and the second circuit produce the first and second combined term sets at substantially a same time; and the first circuit outputs the first combination result before the third circuit outputs the second combination result.

18. A method comprising:

combining, by a first circuit, a first set of a plurality of partial product terms to produce a first combined term set;

combining, by a second circuit, a second set of the plurality of partial product terms to produce a second combined term set;

combining, by a third circuit, the first combined term set and the second combined term set to produce a third combined term set; and outputting the first combined term set as a first combination result and the third combined term set as a second combination result.

19. The method of claim 18, wherein:

the plurality of partial product terms comprises a carry-in term;

the first set of terms comprises a first set of the plurality of partial product terms and the carry-in term; and the second set of terms comprises a remainder of the plurality of product terms.

20. The method of claim 19, wherein the outputting comprises:

outputting the first combination result before outputting the second combination result.

* * * * *